(12) United States Patent
Yu

(10) Patent No.: US 9,158,215 B2
(45) Date of Patent: Oct. 13, 2015

(54) SEAMLESS INTERMEDIATE TRANSFER BELT

(71) Applicant: XEROX CORPORATION, Norwalk, CT (US)

(72) Inventor: Robert C. U. Yu, Sunnyvale, CA (US)

(73) Assignee: XEROX CORPORATION, Norwalk, CT (US)

( * ) Notice: Subject to any disclaimer, the term of this patent is extended or adjusted under 35 U.S.C. 154(b) by 40 days.

(21) Appl. No.: 14/176,592

(22) Filed: Feb. 10, 2014

(65) Prior Publication Data

US 2015/0227065 A1 Aug. 13, 2015

(51) Int. Cl.
| | |
|---|---|
| G03G 15/16 | (2006.01) |
| C08L 71/12 | (2006.01) |
| C09D 171/12 | (2006.01) |
| C08K 3/04 | (2006.01) |
| G03G 7/00 | (2006.01) |
| C09D 5/24 | (2006.01) |

(52) U.S. Cl.
CPC ............. *G03G 7/0053* (2013.01); *C09D 5/24* (2013.01); *G03G 15/162* (2013.01); *C08K 3/04* (2013.01); *C08L 71/12* (2013.01)

(58) Field of Classification Search
CPC .......... C08L 71/12; C08K 3/04; G08G 65/38; G08G 65/48; G08G 65/485
See application file for complete search history.

(56) References Cited

U.S. PATENT DOCUMENTS

| | | | | |
|---|---|---|---|---|
| 4,522,907 | A | * | 6/1985 | Mitsuhashi et al. ........ 430/123.3 |
| 5,543,224 | A | * | 8/1996 | Sakai et al. ................... 428/409 |
| 6,044,243 | A | | 3/2000 | Hara |
| 6,101,360 | A | | 8/2000 | Hara et al. |
| 8,404,796 | B1 | | 3/2013 | Yu |
| 2006/0172097 | A1 | * | 8/2006 | Morikoshi et al. ........... 428/35.7 |
| 2013/0273468 | A1 | * | 10/2013 | Korchev et al. ............. 430/108.7 |

* cited by examiner

*Primary Examiner* — Brieann R Fink
(74) *Attorney, Agent, or Firm* — Pillsbury Winthrop Shaw Pittman LLP

(57) ABSTRACT

An image forming apparatus comprising a seamless intermediate transfer belt, and methods for making the same. The seamless intermediate transfer belt comprises a carbon black dispersion and a mechanically robust polymer material having very high molecular weight.

18 Claims, 3 Drawing Sheets

SEAMLESS INTERMEDIATE TRANSFER BELT

BACKGROUND

The presently disclosed embodiments relate generally to a seamless flexible belt that is useful in imaging apparatus members and components, for use in electrophotographic, including digital printing, apparatuses. More particularly, the embodiments pertain to electrophotographic printing apparatus utilizing an improved and flexible toner image transfer member comprising a composition used to form an image transferring member component, namely, a flexible-single layered seamless intermediate transfer belt. The composition comprises a carbon black dispersed film forming polydimethyl phenylene ether which forms a flexible intermediate transfer belt with numerous beneficial properties, such as, flexibility, high temperature stability, and superior mechanical robustness to effect the service life extension of the prepared intermediate transfer belt in the field.

In electrophotography, particularly the electrophotographic printing, the charge retentive surface, typically known as a photoreceptor, is electrostatically charged, and then exposed to a light pattern of an original image in a master copy to selectively discharge the retentive surface in accordance therewith. The resulting pattern of charged and discharged areas on the photoreceptor surface form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image formed on the photoreceptor surface may then be transferred by either: (1) directly onto a receiving substrate (a support member such as paper) or (2) by first through the use of an intermediate transfer member, and the image affixed thereto to form a permanent record of the image to be reproduced or printed followed by transferring it to the receiving paper for fussing into copy printout. Subsequent to development, excess or residue toner left on the charge retentive surface is cleaned from the surface. The process is useful for light lens copying from an original or printing electronically generated or stored originals such as with a raster output scanner (ROS), where a charged surface may be imagewise discharged in a variety of ways.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated or a second color, say yellow, then for a third color, say magenta, and finally for a fourth color, say cyan. When the toner layers are placed in superimposed registration the desired composite color toner image is formed and fused on the receiving substrate.

The color printing process described above superimposes each image of the color toner layers directly onto a substrate to give color printout copy. However, in other electrophotographic printing systems, they use intermediate transfer belts. In such systems, the sucessive toner image layers are then electrostatically transferred in superimposed registration from the photoreceptor surface onto an intermediate transfer belt. Only after the composite toner image is formed on the intermediate transfer belt is that image transferred and fused onto the receiving substrate. Indeed, some electrophotographic printing systems use multiple intermediate transfer belts, transferring toner to and from belts as required to fulfill the requirements of the machine's overall architecture.

In operation, an intermediate transfer belt is brought into contact with a toner image-bearing member such as a photoreceptor belt or drum. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Typical seamed intermediate transfer belt of prior art may be formed in a number of ways. In such embodiments, a long sheet of material for the belt is made from the formulation as described in prior arts. After cutting the sheet to a specified length, the two opposite ends of the cut sheet are joined by any conventionally known method. Alternatively, for example, the intermediate transfer belt may be formed by ultrasonically welding the opposite ends of the cut sheet to give a seamed belt. Otherwise, the two opposite ends of the cut sheet may be bonded by butt-joints through soluble solvent fusion to give a seamless intermediate belt of present disclosure. A butt-joint is a joint formed by two surfaces that meet without overlap or complex intersection. In essence, intermediate transfer belts often take the form of seamed belts fabricated by fastening two ends of a web material together, such as by welding, sewing, wiring, stapling, or gluing. Belts, sheets, films and the like are important to the xerographic process. Belt function is often significantly affected by the seam of the belt. For example, belts formed according to known butting or overlapping techniques provide a bump or other discontinuity in the belt surface leading to a height differential between adjacent portions of the belt, for example, of 0.010 inches or more depending on the belt thickness. This increased height differential leads to performance failure in many applications. When overlapping the opposite ends of a rectangular cut sheet and ultrasonically welded into a seamed intermediate transfer belt, the seam of the flexible intermediate transfer belt may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life.

Another major disadvantage of having a seam in the flexible intermediate transfer belt is that the seam is a non imageable area due to physical/morphological discontinuity and electrical variation from the bulk of the belt, so it causes print defects in copy image printout.

To avoid the above mentioned problems, seamless intermediate transfer belts are preferred instead. In addition, the entire belt surface of the seamless intermediate transfer belt is imageable area without the complications caused by the seamed region of seamed belts. However, these seamless require manufacturing processes that are more involved and/or expensive than similar seamed intermediate transfer belts. This is particularly true when the intermediate transfer belt is long.

Due to the usage demands on the imaging member systems, the component parts are subject to significant wear which negatively impacts performance and service life. Thus, there is a constant need for improving such systems and parts, such as intermediate transfer belt in particular, to provide good performance and extended service life. In particular, there is a need for an efficient method of providing a seamless belt with improved properties and low cost.

Prior conventional intermediate transfer belts are disclosed in U.S. Pat. Nos. 6,101,360, 6,044,243, and 8,404796 which are hereby incorporated by reference in their entireties. The term "photoreceptor" or "photoconductor" is generally used interchangeably with the terms "imaging member." The term "electrophotographic" includes "electrophotographic" and "xerographic." The terms "charge transport molecule" are generally used interchangeably with the terms "hole transport molecules."

SUMMARY

According to aspects illustrated herein, there is provided a seamless intermediate transfer belt comprising a high molecular weight polymer and a carbon black dispersion, wherein the high molecular weight polymer is selected from the group consisting of

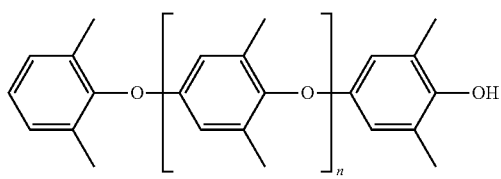

wherein n is the degree of polyerization and is an integer of from about 1,200 to about 4,500;

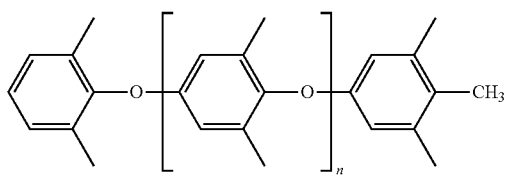

wherein n is the degree of polyerization and is an integer of from about 1,200 to about 4,500;

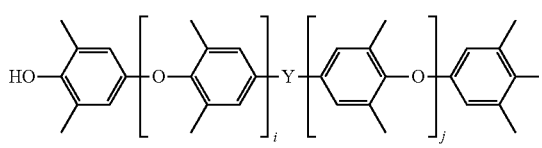

wherein Y is O, $CH_2$, $CH_2$—$CH_2$ or $CH_2CH_2CH_2$, i and j are different values and are from about 600 to about 2,300;

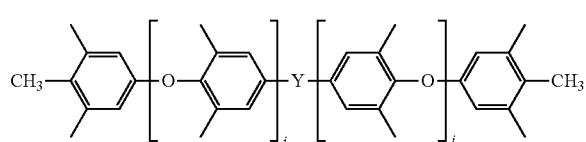

wherein Y is O, $CH_2$, $CH_2$—$CH_2$ or $CH_2CH_2CH_2$, i and j are different values and are from about 600 to about 2,300;

wherein i and j are different values and are from about 600 to about 2,300; and mixtures thereof.

In other aspects, there is provided an image forming apparatus comprising: an imaging member for forming a toner image; and a seamless intermediate transfer belt for transferring the toner image formed on the imaging member to a receiving medium, wherein the seamless intermediate transfer belt comprises a polymer comprising poly (2,6 dimethyl-, 1,4 phenylene ether) and a carbon black dispersion, wherein the polymer has a weight average molecular weight of from about 150,000 to about 550,000 and is selected from the group consisting of

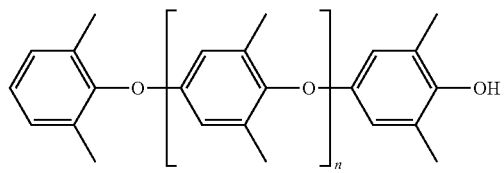

wherein n is the degree of polyerization and is an integer of from about 1,200 to about 4,500;

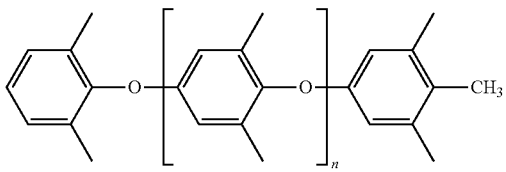

wherein n is the degree of polyerization and is an integer of from about 1,200 to about 4,500;

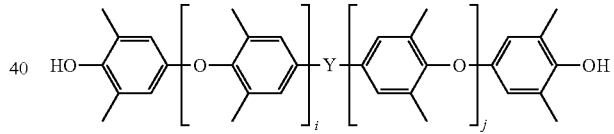

wherein Y is O, $CH_2$, $CH_2$—$CH_2$ or $CH_2CH_2CH_2$, i and j are different values and are from about 600 to about 2,300;

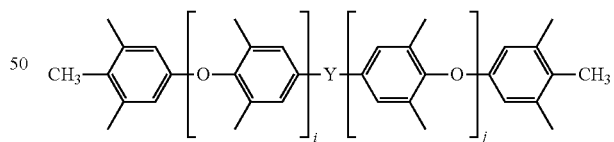

wherein Y is O, $CH_2$, $CH_2$—$CH_2$ or $CH_2CH_2CH_2$, i and j are different values and are from about 600 to about 2,300;

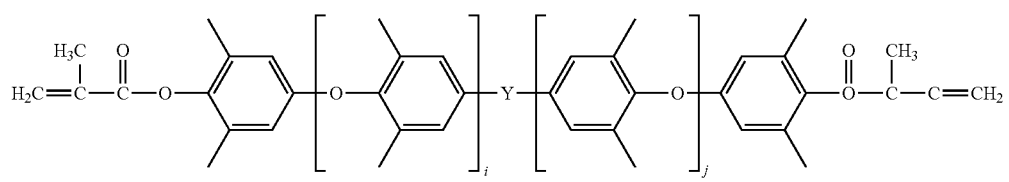

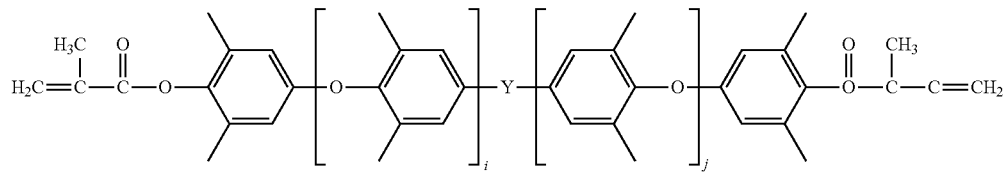

wherein i and j are different values and are from about 600 to about 2,300; and mixtures thereof.

In embodiments, there is further provided a coating solution for forming a seamless intermediate transfer belt comprising a polymer comprising poly (2,6 dimethyl-,1,4 phenylene ether); a carbon black dispersion; and a solvent, wherein the polymer is selected from the group consisting of

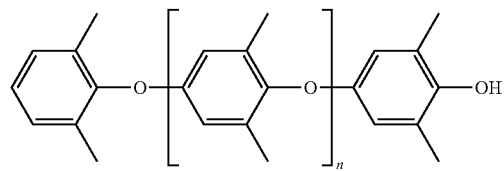

wherein n is the degree of polyerization and is an integer of from about 1,200 to about 4,500;

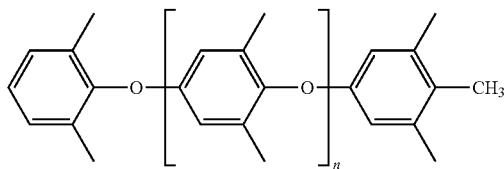

wherein n is the degree of polyerization and is an integer of from about 1,200 to about 4,500;

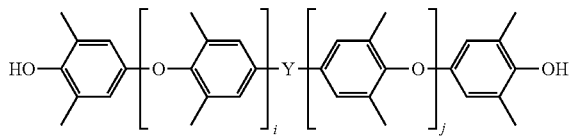

wherein Y is O, $CH_2$, $CH_2$—$CH_2$ or $CH_2CH_2CH_2$, i and j are different values and are from about 600 to about 2,300;

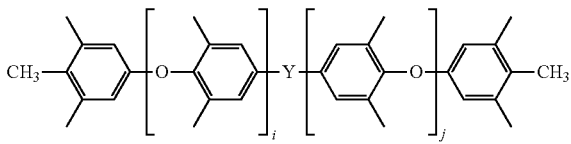

wherein Y is O, $CH_2$, $CH_2$—$CH_2$ or $CH_2CH_2CH_2$, i and j are different values and are from about 600 to about 2,300;

wherein i and j are different values and are from about 600 to about 2,300; and mixtures thereof.

BRIEF DESCRIPTION OF THE DRAWINGS

For a better understanding, reference may be made to the accompanying figures.

DETAILED DESCRIPTION

Figure 1:
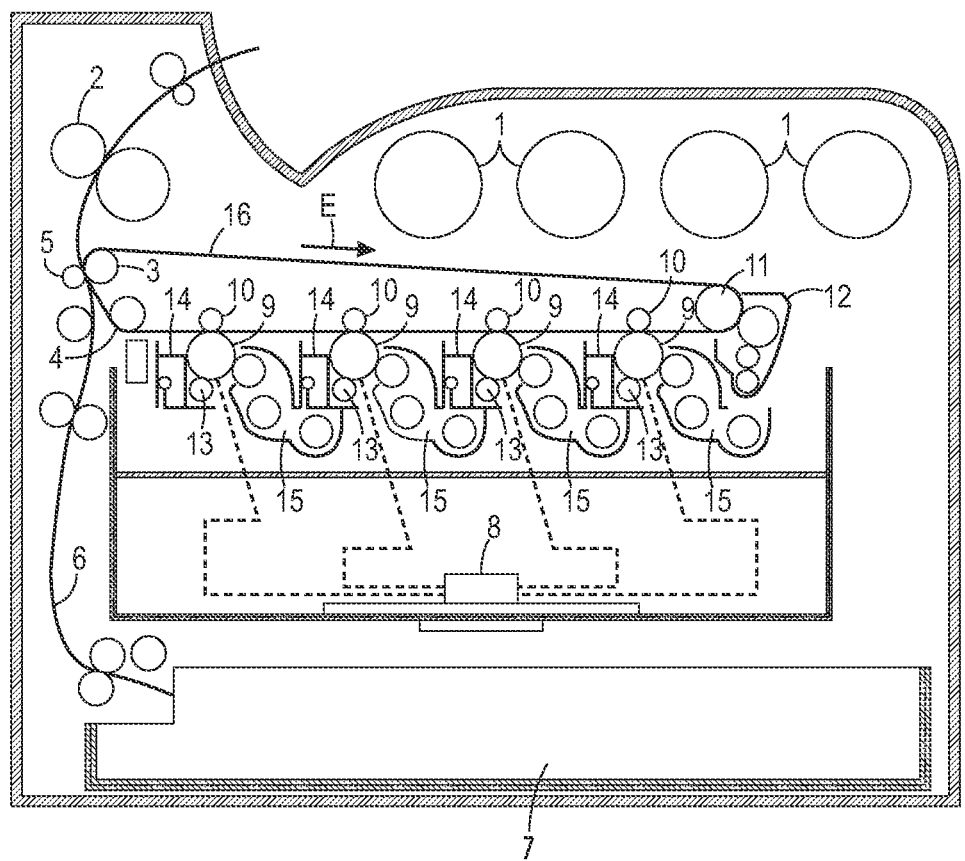
FIG. 1 is a schematic view showing one example of an image forming apparatus according to the present embodiments.

In the following description, reference is made to the accompanying drawings, which form a part hereof and which illustrate several embodiments. It is understood that other embodiments may be used and structural and operational changes may be made without departure from the scope of the present disclosure.

To overcome the limitations associated with imaging member systems and component parts, as discussed above, the disclosed embodiments are directed generally to electrophotographic imaging printing apparatus utilizing an improved toner image transfer member, prepared to give a single layered and seamless configuration comprising a novel material formulation. The novel formulation comprises a mechanically robust polymer material of very high molecular weight, poly 2,6-dimethyl-1,4-phenylene ether, to effect mechanical function improvement, good belt flexibility, extended dynamic fatigue cycling, as well as scratch/wear resistance; and in these embodiments, the seamless intermediate transfer belt of this disclosure is prepared to contain carbon black particles dispersion in its material matrix to render electrical conductivity.

In the embodiments of the present disclosure, there is provided a seamless intermediate transfer belt comprising a film forming poly 2,6-dimethyl-1,4-phenylene ether having a high weight average molecular weight of between about 150,000 and about 550,000, a glass transition temperature (Tg) of from about 150° C. to about 250° C., and with a molecular structure shown below:

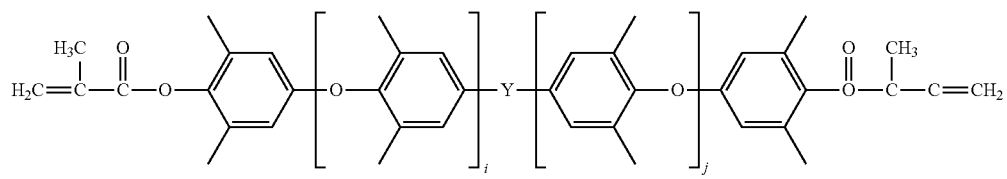

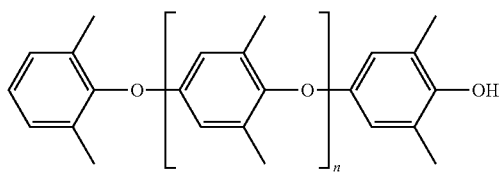

where n is the degree of polyerization and is an integer of from about 1,200 to about 4,500.

The use of this high molecular weight polymer provides improved mechanical function, good belt flexibility, extended dynamic fatigue cycling, as well as scratch/wear resistance. Furthermore, the prepared seamless intermediate transfer belt of the present embodiments provides a belt surface in which the entire surface functions as an imageable belt surface. The preparation of a seamless intermediate transfer belts, using the poly (2,6 dimethyl-1,4 phenylene) ether, according to the method and process of the disclosure of the present embodiments, not only has eliminated the common short comings and problems associated with the discontinuity of a seamed intermediate transfer belt, it also provides a more easily manufactured and lower cost seamless intermediate transfer belt. For example, the preparation and process of the material formulation of this disclosure is unlike the current and prior art polyimide intermediate transfer belt designs, because it does not involve a cross-linking reaction at high temperature during curing and does not involve long processing time (polyimide requires a curing temperature of at least 350° C. and a cure time of many hours).

By comparison, the poly (2,6 dimethyl-1,4 phenylene) ether has very high weight average molecular weight (Mw) (from 150,000 to about 550,000 or at least 350,000 in some embodiments), high glass transition temperature (Tg) to ensure thermal stability (from about 150° C. to about 250° C., and in one embodiment, 220° C.), and can easily be prepared into a coating solution with organic solvent to allow convenient casting over seamless stainless steel substrate belt (or drum) for drying at less than 145° C. and not more than 30 minutes to complete seamless belt fabrication process. Furthermore, the resulting dried coating layer of the poly (2,6 dimethyl-1,4 phenylene) ether seamless belt (formed to encircle over the stainless steel substrate belt) is readily released or removed from the stainless steel substrate belt to give a dimensionally stable and physically/morphologically/electrically uniform seamless intermediate transfer belt.

The selected poly (2,6 dimethyl-1,4 phenylene) ether can conveniently be dissolved in organic solvents such as methylene chloride, 1,1,2 trichloroethane, trichloroethylene, dimethylformamide (DMF), N-methylpyrrolidone (NMP), tetrahydrofuran (THF), toluene, and mixtures thereof to give a coating solution for casting. The prepared coating solution has a solvent concentration of from about 75 to about 85 weight percent, based on the total weight of the coating solution.

The exemplary embodiments of this disclosure are described below with reference to the drawings. The specific terms are used in the following description for clarity, selected for illustration in the drawings and not to define or limit the scope of the disclosure. The same reference numerals are used to identify the same structure in different figures unless specified otherwise. The structures in the figures are not drawn according to their relative proportions and the drawings should not be interpreted as limiting the disclosure in size, relative size, or location.

The image forming apparatus of the present embodiments is not particularly limited insofar as it belongs to an intermediate transfer body format, that is, an image forming apparatus having a structure provided with at least a first transfer means(/apparatus) for primarily transferring a toner image formed on an image bearing body onto an intermediate transfer belt, and a second transfer means(/apparatus) for secondarily transferring a toner image transferred on the intermediate transfer belt, onto a transfer body. Examples of the image forming apparatus of the present embodiments include a normal monocolor image forming apparatus in which only single color toners are accommodated in a developing device, a color image forming apparatus in which successive primary transfer of a toner image held on an image bearing body onto an intermediate transfer body is repeated, and a tandem-type color image forming apparatus in which a plurality of image bearing bodies provided with developing equipment for every color are arranged on an intermediate transfer body in series.

In addition, according to known methods, the image forming apparatus of the present embodiments may be optionally provided with an image bearing body, an electrification means for electrifying an image bearing body surface, an exposing means for exposing an image bearing body surface to the light to form an electrostatic latent image, a developing means for developing a latent image formed on an image bearing body surface using a developer to form a toner image, a means for fixing a toner image on a transfer body, a cleaning means for removing a toner and refuse attached to an image bearing body, and a discharging means for removing an electrostatic latent image remaining on an image bearing body surface, if necessary.

A specific embodiment of a tandem-type color image forming apparatus will be explained below using the drawings.

FIG. 1 is a schematic view showing one example of the image forming apparatus of the present embodiments. The image forming apparatus showed in FIG. 1 contains, as principal constituent members, four toner cartridges 1, one pair of fixing rolls 2, a back-up roll 3, a tension roll 4, a secondary transfer roll (secondary transfer means) 5, a paper path 6, a paper tray 7, a laser-generating device 8, four photoreceptors (image members) 9, four primary transfer rolls (primary transfer means) 10, a driving roll 11, a transfer cleaner 12, four electrification rolls 13, a photoreceptor cleaner 14, a developing device 15, and a seamless intermediate transfer belt 16. In the image forming apparatus shown in FIG. 1, a seamless intermediate transfer belt prepared according to the description of the present embodiments is used as an intermediate transfer belt 16 which functions as a means for overlaying toner images, and a means for transferring a toner image.

Next, construction of an image forming apparatus as shown in FIG. 1 will be explained in stages. First, an electrification roll 13, a developing device 15, a primary transfer roll 10 disposed via an intermediate transfer belt 16, and a photoreceptor cleaner 14 are arranged counterclockwisely around a photoreceptor 9, and one set of these members form a developing unit corresponding to one color. In addition, each of these developing units is provided with a toner cartridge 1 for replenishing developer to each developing device 15, and a laser-generating device 8 which can irradiate laser light to a surface of the photoreceptor 9 between the electrifying roll 13 and the developing device 15 according to image information is provided relative to the photoreceptor 9 of each developing unit.

Four developing units corresponding to four colors (e.g. cyan, magenta, yellow, and black) are arranged in series in an approximately horizontal direction in an image forming apparatus, and an intermediate transfer belt 16 is provided so as to pass through a nip part between the photoreceptor 9 and the primary transfer roll 10 of each of the four developing units. The intermediate transfer belt 16 is stretched by a back-up roll 3, a tension roll 4, and a driving roll 11 which are provided in this order counterclockwisely on its inner circumferential side. Four primary transfer rolls are situated between the back-up roll 3 and the tension roll 4. A transfer cleaner 12 for cleaning an external circumferential surface of the intermediate transfer belt 16 is provided so as to contact with the driving roll 11 under pressure, via the intermediate transfer belt 16, on an opposite side of the driving roll 11.

In addition, a secondary transfer roll 5 for transferring a toner image formed on the external circumferential surface of the intermediate transfer belt 16 onto a surface of a recording paper conveyed from a paper tray 7 via a paper path 6 is provided so as to contact with the back-up roll 3 under pressure, on an opposite side of the back-up roll 3 via the intermediate transfer belt 16. On the external circumferential surface of the intermediate transfer belt 16 between the back-up roll 3 and the driving roll 11, a discharging roll (not shown) for discharging the external circumferential surface is provided.

In addition, a paper tray 7 for stocking recording paper is provided at the bottom of the image forming apparatus, and paper can be supplied so as to pass through a pressure-contacting part between the back-up roll 3 and the secondary transfer roll 5 constituting a secondary transfer portion from the paper tray 7 via a paper path 6. A recording paper which has passed through this pressure-contacting part can be conveyed by a conveying means (not shown) so as to pass through a pressure-contacting part of a pair of fixing rolls 2 and, finally, can be ejected outside of the image forming apparatus.

Next, an image forming method using the image forming apparatus of FIG. 1 will be explained. A toner image is formed at every developing unit, and the surfaces of the photoreceptors 9 rotating counter-clockwise are uniformly electrified with electrifying rolls 13, after which latent images are formed on the surfaces of the electrified photoreceptors 9 with a laser-generating device 8 (exposing device), and then the latent images are developed with a developer supplied from the developing devices 15 to form toner images, and the toner images brought to a pressure-contacting part between the primary transfer rolls 10 and the photoreceptors 9 are transferred onto the external circumferential surface of the intermediate transfer belt 16 rotating in the direction of arrow E. Toner and refuse adhered to the surface of the photoreceptors 9 after transfer of the toner images are cleaned with photoreceptor cleaners 14, ready for formation of the next toner image.

Toner images of each color developed at every developing unit are successively superimposed on the external circumferential surface of the intermediate transfer belt 16 so as to correspond to image information, and are delivered thus to the secondary transfer portion where they are transferred onto a surface of a recording (or receiving) paper conveyed from paper tray 7 via paper path 6, with the secondary transfer roll 5. A recording paper onto which a toner image has been transferred is further fixed by heating under pressure upon passing through a pressure-contacting part of the pair of fixing rolls 2 constituting a fixing portion and, after formation of an image on a recording medium surface, it is discharged outside the image forming apparatus.

An intermediate transfer belt 16 which has passed through a secondary transfer portion proceeds further in the direction of arrow E, the external circumferential surface thereof is electricity-removed with a discharging roll (not shown), and the external circumferential surface is cleaned with a transfer cleaner 12, ready for transfer of a next toner image.

Figure 2:
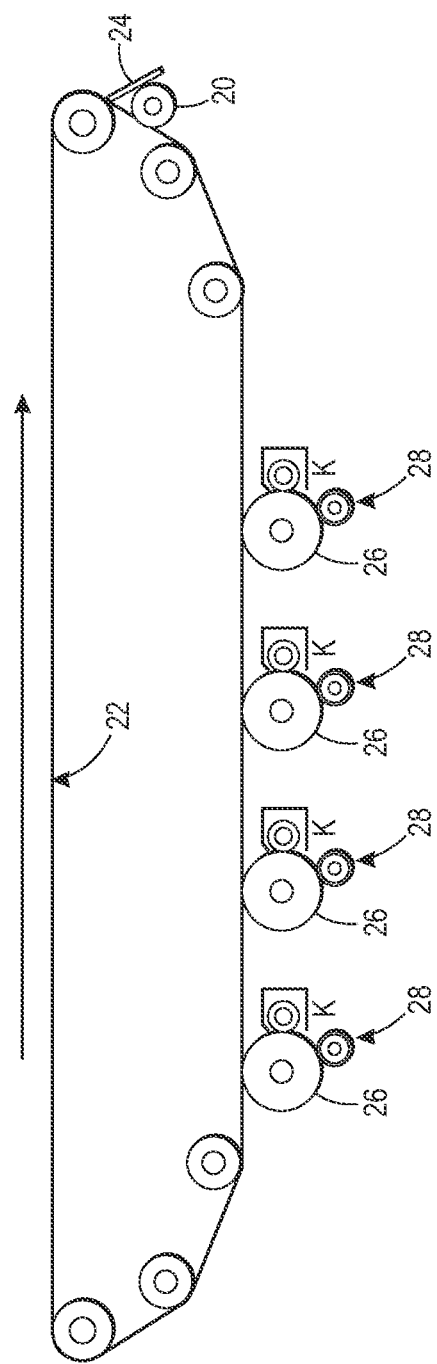
FIG. 2 is a schematic view showing a portion of an image forming apparatus according to the present embodiments.

Shown in FIG. 2 is an exemplary embodiment of a portion of an image forming apparatus according to the present embodiments. As shown, a delivery member 20 is placed in contact with the seamless intermediate transfer belt 22 of this disclosure in the post-cleaning position after the intermediate transfer belt cleaning unit 24, such as a blade. The intermediate transfer belt cleaning unit is disposed in contact with the surface of the intermediate transfer belt for cleaning off residual toner and debris from the intermediate transfer belt. The single delivery member 20 can supply a release material or other similar material to the seamless intermediate transfer belt 22 which in turn delivers the same to the surface of each of the photoreceptors 26 to further help clean the transfer belt or reduce friction to the surface. In alternative embodiments, there can be provided a separate delivery member for each of the photoreceptors 26 in the CRU 28, rather than only the single delivery member 20. As shown, the electrostatic latent image formed on the photoreceptor 26 is developed by a rotary development device in which toner developer units K of the color black, cyan, magenta and yellow are disposed.

Figure 3:
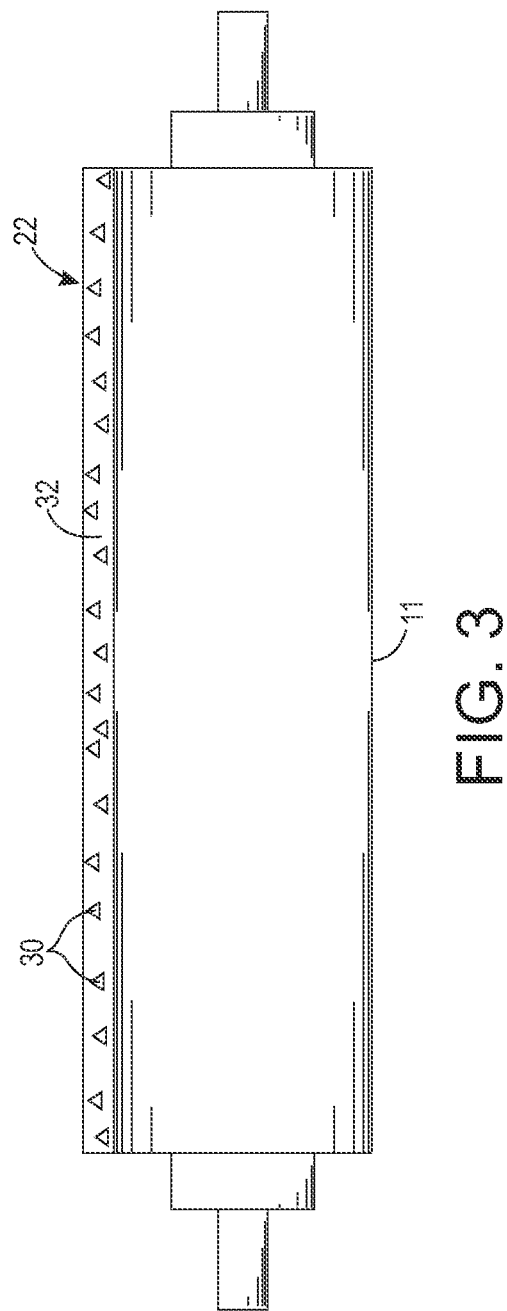
FIG. 3 is a cross-sectional view of a seamless intermediate transfer belt according to the present embodiments.

As shown in FIG. 3, there is provided a seamless intermediate transfer belt 22, made from the novel formulation comprising the film forming poly (2,6 dimethyl-1,4 phenylene) ether 32 of this disclosure and conductive carbon black particles 30 dispersed therein to provide suitable electrical conductivity as well as increased in mechanical function which resists surface scratch/wear failure, early onset of fatigue-bend induced belt cracking, and premature belt rupture under normal dynamic intermediate transfer belt machine cycling conditions in the field to thereby effect service life extension of the belt. Other benefits of the seamless intermediate transfer belt include desirable properties such as good electrical resistivity (about $10^{11}$ ohms/sq at ambient and A Zone conditions), good mechanical Young's Modulus strength (of at least 400,000 psi), coefficient of thermal expansion (less than $6\times10^{-5}/°$ C.), coefficient of humidity expansion (less than $3\times10^{-5}$/RH %), and dynamic cycling life extension over ½ inch fatigue roller flexing test (up to 1.0 Mcycles). The intermediate transfer belt is prepared by first dissolving the novel poly 2,6-dimethyl-1,4-phenylene ether in a preferred organic solvent to formed a coating solution, then solution coated over the top outer surface of a flexible stainless steel substrate belt or rigid drum, and then followed by subsequently dried at elevate temperature of at least 10° C. higher than the boiling point of the solvent. The resulting dried coating layer is released from the substrate to give a seamless intermediate transfer belt of this disclosure.

In a first embodiment, the seamless intermediate transfer belt is single layer and comprises a high molecular weight film forming polyphenylene ether. In particular, the polymer is a film forming poly 2,6,-dimethyl-1,4-phenylene ether having a high weight average molecular weight of between about 150,000 and about 550,000 and with a Molecular Structure (IA) shown below:

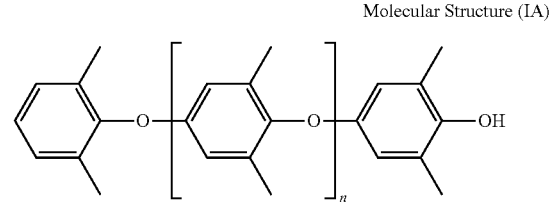

Molecular Structure (IA)

where n is the degree of polymerization and is an integer of from about 1,200 to about 4,500.

The use of this high molecular weight polymer provides improved mechanical function, good belt flexibility, extended dynamic fatigue cycling as well as scratch/wear resistance. More importantly, the prepared seamless intermediate transfer belt provides entire imageable belt surface. The preparation of a seamless intermediate transfer belts, using poly 2,6-dimethyl-1,4-phenylene ether, according to the disclosure of the present embodiments, not only has eliminated the common short comings and problems associated with prior art seamed intermediate transfer belts, it is also a lower cost process. For example, the preparation and process of the material formulation of this disclosure requires a lower curing temperature and less time to complete.

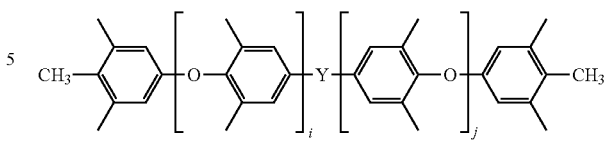

Molecular Structure (IIB)

In yet another alternative embodiment, the high molecular weight polymer employed to prepare the seamless intermediate transfer belt is an extended variance modified from Molecular Structure (IIA) to have another terminal end group and give a Molecular Structure (III) shown below:

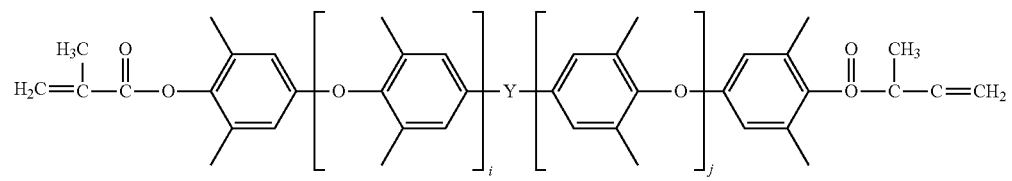

Molecular Structure (III)

In a second embodiment, the film forming poly 2,6,-dimethyl-1,4-phenylene ether used comprises a —CH$_3$ terminated end group to replace the —OH terminal. Thus, in this film forming poly 2,6,-dimethyl-1,4-phenylene ether, the molecular structure becomes:

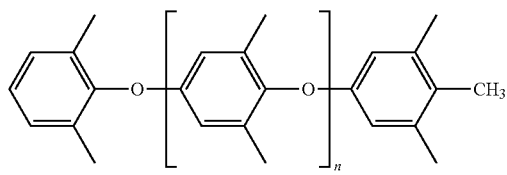

Molecular Structure (IB)

In alternative embodiments, the high molecular weight polymer employed to prepare the seamless intermediate transfer belt is a modification derived from the poly 2,6-dimethyl-1,4-phenylene ether to give a Molecular Structure (IIA) shown below:

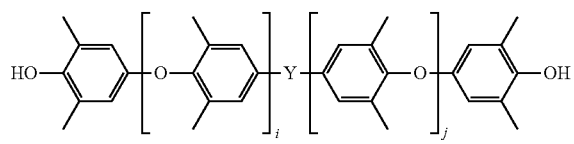

Molecular Structure (IIA)

where i and j are integers, while i and j are both from 600 to 2,300 but they are different values. Y is O, CH$_2$, CH$_2$—CH$_2$, and CH$_2$CH$_2$CH$_2$.

In another alternative embodiment, the high molecular weight polymer employed to prepare the seamless intermediate transfer belt is a variance derived from Molecular Structure (IIA) by replacing the —OH by —CH$_3$ end groups. Thus, in this film forming polymer molecular structure becomes:

where i and j are integers, while i and j are both from 600 to 2,300 but they are different values.

In additional embodiments, the seamless intermediate transfer belts prepared according to the present disclosure may also include a carbon black dispersion in each material matrix to render the desired electrical conductivity. The carbon black dispersion is present in the intermediate transfer belt in an amount of from about 5.0 to about 15.0 percent, corresponds to about 85 and about 75 percent of the poly (2,6 dimethyl-1,4 phenylene ether); or from about 9.0 to about 12.0 percent, corresponds to about 81 and about 78 percent of the poly (2,6 dimethyl-1,4-phenylene ether) by weight based on the total weight of the resulting intermediate transfer belt.

In specific embodiments, the carbon black is included into the intermediate transfer belt by preparing and adding a carbon black dispersion into a solution prepared by dissolving the poly (2,6-dimethyl-1,4-phenylene) ether in an organic solvent, then solution coating it over the top surface of a flexible stainless steel substrate belt, and followed by subsequently dried at elevate temperature to give a flexible seamless intermediate transfer belt of this disclosure.

The resulting seamless intermediate transfer belt as obtained according to this disclosure has a resistivity of between $1.0 \times 10^9$ ohms/sq. and $1.0 \times 10^{13}$ ohms/sq.; or between $1.0 \times 10^{10}$ ohms/sq. and $1.0 \times 10^{12}$ ohms/sq.; or $1.0 \times 10^{11}$ ohms/sq. and $5.0 \times 10^{11}$ ohms/sq. In these embodiments, the seamless intermediate transfer belt prepared according to the material formulation and process has a thickness of from about 60 to about 100 micrometers, or from about 70 to about 90 micrometers after drying. In a specific embodiment, the resulting seamless intermediate transfer belt thus obtained is 85 microns.

Other prior art methods include forming the belt material on a tubular core, in which the seamless belt formulation is developed on the inner and outer circumference of the tubular core into a tubular form by coating according to the immersion method, heating and centrifugal forming method or applying method, and the developed layer is dried and formed into a film, as disclosed in, for example, JP-A No. 61-95361, JP-A No. 62-22514, and JP-A No. 3-180309, which are incorporated herein by reference in their entireties.

However, for the seamless intermediate transfer belt of this disclosure, the present embodiments are prepared by first dissolving the poly 2,6-dimethyl-1,4-phenylene ether in an organic solvent to formed a coating solution, then solution coated over the top surface of a flexible stainless steel substrate belt or rigid drum, and followed by drying at an elevated temperature of at least 10° C. higher than the boiling point of the solvent. The resulting dried coating layer is released from the substrate to give a seamless intermediate transfer belt of this disclosure.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Material Selection

In this seamless intermediate transfer belt (ITB) preparation, a specific high molecular weight film forming poly (2,6 dimethyl-,1,4 phenylene ether), available from Sabic Innovative Plastics as PPO 6130, was selected as the material candidate of choice. The poly (2,6-dimethyl-,1,4-phenylene ether) (PPO) has an weight average molecular weight of 350,000, a glass transition temperature (Tg) of 220° C., and a molecular structure shown in the formula below:

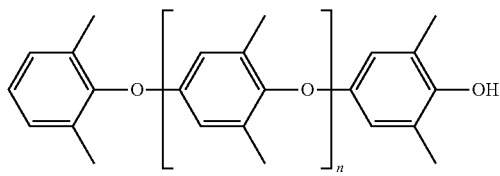

where n is the degree of polyerization of 2,915.

The selection of PPO 6130 for seamless ITB preparation is based on the fact that it has high weight average molecular weight (Mw), can conveniently be made into a coating solution with carbon black dispersion, and can be readily cast over seamless stainless steel substrate belt (or drum) for drying at 145° C. in 30 minutes. Furthermore, the resulting dried coating layer of the ITB belt (formed/encircled over the substrate belt) obtained is easily released or removed from the substrate belt to give a dimensionally stable and uniform seamless ITB. Other benefits of the present embodiments include chemical and mechanical properties.

Coating Solution Preparation: Preparation of Master Solution

A 17.5% wt PPO 6130 solution was prepared by first mixing a pre-measured amount of the polymer in 1,1,2 trichloroethane solvent. The mixture was rolled-mill for at least 12 hours overnight and then kept in 90° C. hot water bath to allow total dissolution of the polymer in the solvent and gave a slightly amber color clear matter solution.

Coating Solution Preparation: Preparation of Mill-Base Solution

A 12% wt PPO 6130 solution was again prepared by first mixing a precise amount PPO 6130 polymer in solvent, rolled-mill overnight and kept in in 90° C. hot water bath to dissolve the polymer. An exactly predetermined amount of carbon black (Special Black 4 from Evonik Industries) was then added directly into the the 12% PPO 6130 solution and followed by attrition milling (with 1 mm diameter stainless steel beads) for 6 hours to give a 10% wt carbon black dispersion mill-base PPO solution. The resulting dispersion mill-base solution as obtained has a 21.5% wt solid content.

Example 1

Pure PPO Coating Solution Preparation

To assess the mechanical integrity and strength of the PPO 6130 polymer (having hydrophobicity) as viable candidate for seamless ITB fabrication, a 17.5% wt PPO 6130 polymer coating solution was prepared by dissolving the PPO 6130 in 1,1,2 trichloroethane solvent by following the same procedures described in the master solution preparation discussed above, except that a 1.1% wt of Stepfac release agent (with respect only to the weight of PPO polymer) was included in the coating solution.

Example 2

Intermediate Transfer Belt (ITB) Coating Solution Preparation

The prepared 21.5% wt mill-base solution was then mixed with the 17.5% wt PPO 6130 master solution as 1 part (21.5% wt mill-base) with 4 parts (17.5% wt PPO 6130 master solution) and an additional amount of a Stepfac release agent of 0.35% wt and of a fluoro compound surface leveling agent (Novec FC4432 from 3M Corporation) at 0.01% wt. The mixture was again rolled-mill for at least 12 hours to give a resulting ITB coating solution.

Coating Layer Preparation: Pure PPO Layer Preparation

The 17.5% wt PPO 6130 polymer coating solution of Example 1 prepared above was hand coated in similar fashion, using the 40 mil bar gap, over a rigid stainless steel substrate sheet and dried at 140° C. for one hours to give a resulting 90 micrometers pure PPO 6130 coating readily released from the stainless steel sheet.

Coating Layer Preparation: ITB Layer Preparation

The resulting ITB coating solution of Example 2 of this disclosure (having 15.4% wt PPO polymer, 2.2% wt carbon black, and 0.01% wt FC4432 as obtained from the above was hand coated, with a 40 mil bar gap, over a rigid stainless steel substrate sheet and dried at 140° C. for one hours to give a final 85-micron thick dried PPO ITB layer easily released from the stainless steel sheet. Mechanical fatigue bending test carried out of the PPO ITB, by dynamic fatigue flexing, was seen lasting up to a million cycles over ½ inch roller.

The ITB layer comprising PPO/carbon black dispersion as obtained was determined to have a resistivity of about $1 \times 10^{11}$ ohms/sq. In addition, the Coefficient of Thermal Expansion (CTE) was found to be about $2.3 \times 10^{-5}/°$ C. and had a Coefficient of Humility Expansion (CHE) of about $2.8 \times 10^{-5}$/RH % (28 ppm/RH %). The PPO ITB, by comparison to the mainline cross-linked seamed polyimide ITB, had a CTE of about $6.0 \times 10^{-5}/°$ C. and a CHE of about $3.34 \times 10^{-5}$/RH % (33.4 ppm/RH %). Thus, the PPO ITB was shown to have improved properties.

Mechanical Property Determination

Both the pure PPO 6130 coating and the disclosed PPO6130 ITB layer obtained according to the preceding description procedures were each determined for their Young's Modulus and Break Strength. The results obtained are listed in the table below:

| Coating Layer | Molecular Weight | Young's Modulus (Mpa/PSI) | Break Strength (Mpa/PSI) |
| --- | --- | --- | --- |
| Pure PPO | 350,000 | 3,000/435,000 | 80/11,600 |
| Disclosed PPO ITB | Same | 3,190/462,550 | 86/12,470 |

Based from the experimental results obtained above, the high molecular weight film forming PPO 6130 polymer selected for the disclosed seamless ITB preparation was successfully demonstrated. A coating solution prepared to contain the carbon black dispersion and using 1,1,2 trichloroethane as solvent was demonstrated to provide a good quality PPO ITB layer and with proper electrical resistivity of about $1 \times 10^{11}$ ohms/sq. and good mechanical property.

In summary, the resulting intermediate transfer belt prepared using the poly 2,6-dimethyl-1,4-phenylene ether provides the benefits of: total belt surface continuity without a seam, homogeneous electrical property throughout the bulk of the belt, and low belt manufacture cost due to being a single layer without involving cross-linking for easy processing, and being based on a cheaper polymer.

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. An intermediate transfer belt comprising a high molecular weight polymer and a carbon black dispersion, wherein the high molecular weight polymer is selected from the group consisting of

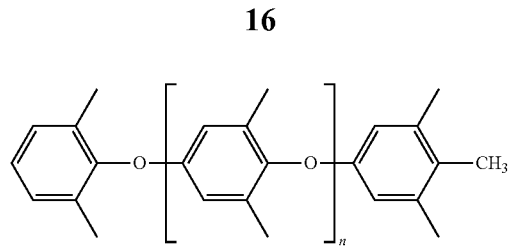

wherein n is the degree of polyerization and is an integer of from about 1,200 to about 4,500;

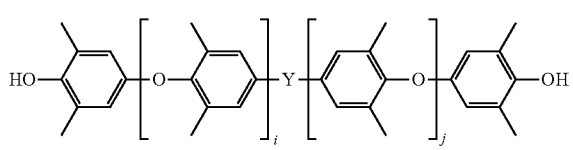

wherein Y is O, $CH_2$, $CH_2$—$CH_2$ or $CH_2CH_2CH_2$, i and j are different values and are from about 600 to about 2,300;

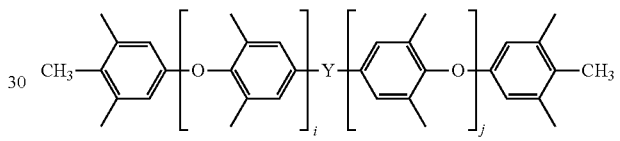

wherein Y is O, $CH_2$, $CH_2$—$CH_2$ or $CH_2CH_2CH_2$, i and j are different values and are from about 600 to about 2,300;

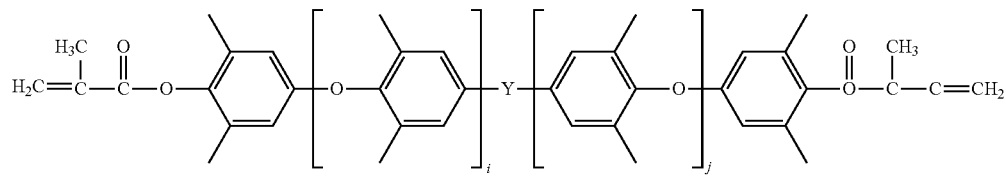

wherein i and j are different values and are from about 600 to about 2,300; and mixtures thereof, wherein the intermediate transfer bet is seamless.

2. The seamless intermediate transfer belt of claim 1, wherein the high molecular weight polymer has a weight average molecular weight of from about 150,000 to about 550,000.

3. The seamless intermediate transfer belt of claim 1, wherein the high molecular weight polymer has a glass temperature (Tg) of from about 150° C. to about 250° C.

4. The seamless intermediate transfer belt of claim 2 wherein the high molecular weight polymer has a weight average molecular weight of 350,000.

5. The seamless intermediate transfer belt of claim 2, wherein the high molecular weight polymer has a glass temperature (Tg) of 220° C.

6. The seamless intermediate transfer belt of claim 1, wherein the carbon black dispersion is present in an amount of from about 5.0 to about 15.0 percent by weight of the total weight of the seamless intermediate transfer belt.

7. The seamless intermediate transfer belt of claim 6, wherein the carbon black dispersion is present in an amount of from about 9.0 to about 12 percent by weight of the total weight of the seamless intermediate transfer belt.

8. The seamless intermediate transfer belt of claim 1, wherein the polymer is present in an amount of from about 75 to about 85 percent by weight of the total weight of the seamless intermediate transfer belt.

9. The seamless intermediate transfer belt of claim 8, wherein polymer is present in an amount of from about 78 to about 81 percent by weight of the total weight of the seamless intermediate transfer belt.

10. The seamless intermediate transfer belt of claim 1 further including one or more additives selected from the group consisting of a release agent, surface leveling agent, and mixtures thereof.

11. The seamless intermediate transfer belt of claim 1 having a thickness of from about 60 to about 100 micrometers.

12. The seamless intermediate transfer belt of claim 1 having an electrical resistivity of between $1.0 \times 10^9$ ohms/sq. and $1.0 \times 10^{13}$ ohms/sq.

13. An image forming apparatus comprising:
an imaging member for forming a toner image; and
a seamless intermediate transfer belt for transferring the toner image formed on the imaging member to a receiving medium, wherein the seamless intermediate transfer belt comprises a polymer and a carbon black dispersion, wherein the polymer has a weight average molecular weight of from about 150,000 to about 550,000 and is selected from the group consisting of

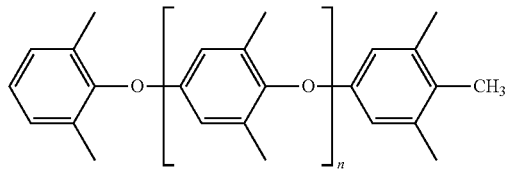

wherein n is the degree of polyerization and is an integer of from about 1,200 to about 4,500;

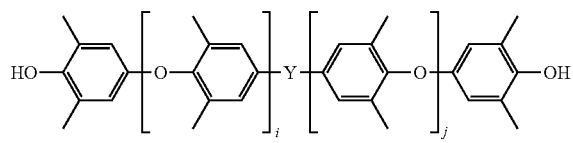

wherein Y is O, $CH_2$, $CH_2$—$CH_2$ or $CH_2CH_2CH_2$, i and j are different values and are from about 600 to about 2,300;

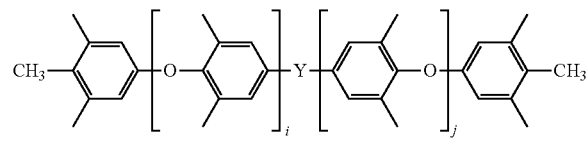

wherein Y is O, $CH_2$, $CH_2$—$CH_2$ or $CH_2CH_2CH_2$, i and j are different values and are from about 600 to about 2,300;

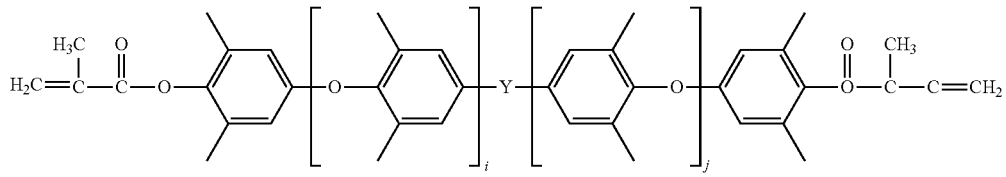

wherein i and j are different values and are from about 600 to about 2,300; and mixtures thereof.

14. A coating solution for forming a seamless intermediate transfer belt comprising
a polymer;
a carbon black dispersion; and
a solvent, wherein the polymer is selected from the group consisting of

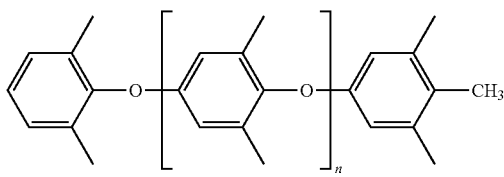

wherein n is the degree of polyerization and is an integer of from about 1,200 to about 4,500;

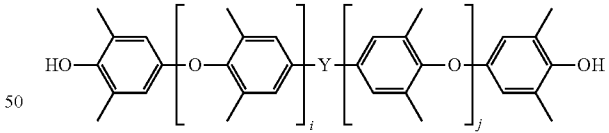

wherein Y is $CH_2$, $CH_2$—$CH_2$ or $CH_2CH_2CH_2$, i and j are different values and are from about 600 to about 2,300;

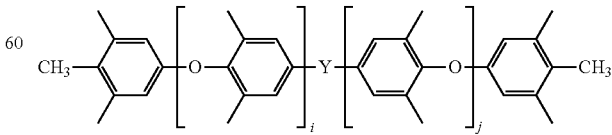

wherein Y is O, $CH_2$, $CH_2$—$CH_2$ or $CH_2CH_2CH_2$, i and j are different values and are from about 600 to about 2,300;

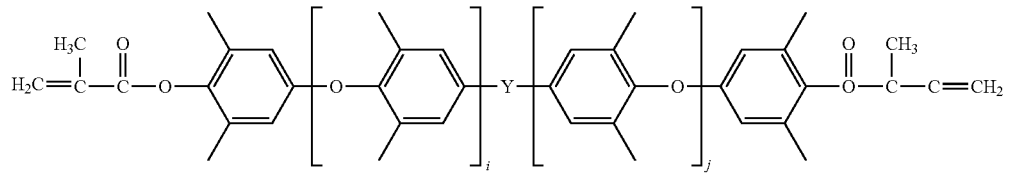

wherein i and j are different values and are from about 600 to about 2,300; and mixtures thereof.

15. The coating solution of claim 14, wherein the solvent is selected from the group consisting of methylene chloride, 1,1,2 trichloroethane, trichloroethylene, dimethylformamide (DMF), N-methylpyrrolidone (NMP), tetrahydrofuran (THF), toluene, and mixtures thereof.

16. The coating solution of claim 14, wherein the carbon black dispersion is present in an amount of from about 5.0 to about 15.0 percent by weight of the total weight of the coating solution.

17. The coating solution of claim 14, wherein the polymer is present in an amount of from about 75 to about 85 percent by weight of the total weight of the coating solution.

18. The coating solution of claim 14, wherein the solvent is present in an amount of from about 75 to about 85 percent by weight of the total weight of the coating solution.

* * * * *